United States Patent
Kim et al.

(10) Patent No.: US 8,203,394 B2
(45) Date of Patent: Jun. 19, 2012

(54) RF VECTOR MODULATOR FOR BEAMFORMING

(75) Inventors: Ki-Jin Kim, Gwangju-Si (KR); Kwang-Ho Ahn, Yongin-Si (KR)

(73) Assignee: Korea Electronics Technology Institute (KR)

( * ) Notice: Subject to any disclaimer, the term of this patent is extended or adjusted under 35 U.S.C. 154(b) by 250 days.

(21) Appl. No.: 12/646,686

(22) Filed: Dec. 23, 2009

(65) Prior Publication Data
US 2011/0140964 A1 Jun. 16, 2011

(30) Foreign Application Priority Data
Dec. 11, 2009 (KR) .......................... 10-2009-0122910

(51) Int. Cl.
*H04L 27/36* (2006.01)
(52) U.S. Cl. .......................... 332/103; 375/298; 455/110
(58) Field of Classification Search .................... 455/91, 455/110, 130, 114.2, 114.3, 127.1, 127.2; 375/260, 261, 298, 302; 332/103, 145, 144
See application file for complete search history.

(56) References Cited

U.S. PATENT DOCUMENTS

| 6,313,803 B1 | 11/2001 | Manasson et al. ............ 343/756 |
| 2007/0146201 A1 | 6/2007 | Hules et al. ................... 342/359 |
| 2008/0032639 A1 * | 2/2008 | Kee et al. ...................... 455/110 |
| 2008/0195988 A1 | 8/2008 | Goren et al. ...................... 716/5 |
| 2009/0061795 A1 | 3/2009 | Doan et al. ...................... 455/91 |

FOREIGN PATENT DOCUMENTS

| KR | 1020020084280 A | 11/2002 |
| KR | 1020040005251 A | 1/2004 |
| KR | 1020040039109 A | 5/2004 |
| KR | 1020040097897 | 11/2004 |
| KR | 1020080052111 A | 6/2008 |
| KR | 1020080054384 A | 6/2008 |
| WO | WO 0003475 A1 * | 1/2000 |

OTHER PUBLICATIONS

Office Action dated Feb. 11, 2011 corresponding to Korean Patent Application No. 1020090122910.

* cited by examiner

*Primary Examiner* — Ryan Johnson
(74) *Attorney, Agent, or Firm* — Ohlandt, Greeley, Ruggiero & Perle, LLP

(57) ABSTRACT

A beamforming RF vector modulator is provided. The beamforming RF vector modulator includes a first amplification part for amplifying an input single RF signal and outputting differential RF signals of different phases; an RF signal converter for receiving the differential RF signals and outputting four signals I+, I−, Q+, and Q− of different phases, the RF signal converter comprising a polyphase filter which is virtually opened by resonance of an output terminal comprising a transmission line load; a Variable Gain Amplifier (VGA) part comprising a I VGA which varies an amplitude and a polarity of the signals I+ and I−, and a Q VGA which varies the amplitude and the polarity of the signals Q+ and Q− according to a control signal; and an RF signal synthesizer for synthesizing an output current of the I VGA and an output current of the Q VGA.

8 Claims, 5 Drawing Sheets

RF VECTOR MODULATOR FOR BEAMFORMING

PRIORITY

This application claims the benefit under 35 U.S.C. §119(a) to a Korean patent application filed in the Korean Intellectual Property Office on Dec. 11, 2009 and assigned Serial No. 10-2009-0122910, the entire disclosure of which is hereby incorporated by reference.

BACKGROUND OF THE INVENTION

1. Field of the Invention

The present invention relates generally to an RF vector modulator for beamforming. More particularly, the present invention relates to the beamforming RF vector modulator which can simply implement the beamforming with low power in the next-generation Gbps-level WPAN.

2. Description of the Related Art

To provide directional wireless communication (i.e., increase the signal strength by focusing the energy of an RF signal transmitted in a specific direction), transceivers can adopt a beamforming technique. In general, the beamforming technique is a baseband processing technique for generating the focused antenna beam by shifting the signal in the time or in the phase so as to offer the gain of the signal in an intended direction and to attenuate the signal in other directions.

For doing so, a system can be constituted by including the array of antennas, transmitters, and receiver in a reception part and a transmission part respectively. The beamforming technique maximizes Signal Noise Ratio (SNR) by forming the beam in the intended direction as shown in FIG. 1, and regulates the beam radiated from the antenna by applying different phase magnitudes to the transmitters and the receivers.

In this regard, a first conventional beamforming technique is disclosed in Korean Patent Registration No. 10-0809313, which relates to a method for enhancing wireless communication performance with a plurality of antennas and a plurality of RF receivers by selecting the receiver of the strongest power fed into to the receiver. The Korean Patent Registration No. 10-0809313 requires the plurality of the receivers and acquires no transmission and reception gain through the beamforming.

Second, Korean Patent Registration 10-0465314 realizes the antenna beamforming using a digital beamforming scheme such as antenna isolated over a certain distance, multichannel converter, correlation vector estimator, and beamformer. Korean Patent Registration 10-0465314 requires analog circuits as many as the antennas and exhibits too low power consumption and signal processing rate to process the high speed data in the next-generation WPAN. Hence, its application is limited in the high-speed and low-power data communication system.

Third, Korean Patent Registration 10-0474849 applies an algorithm for enhancing the communication performance by adopting the beamforming technique. For the beamforming, the disclosed method forms the beam in the intended direction as shown in FIG. 1 by regulating the phase and the amplitude into each antenna. The beamforming method of FIG. 1 also requires a plurality of transceivers and does not describe a detailed design for generating the phase and the amplitude.

The second and third techniques form the beam in the intended direction by digitally controlling the beamforming and thus improve the communication performance as a greater number of transceivers are used. However, there occur various problems such as the number of the transceivers and the consumption of resources for the signal processing.

Wireless Personal Area Network (WPAN) is a wireless network enabling devices in a short range to communicate data with low power. The WPAN performs the data communication using Time Division Multiple Access (TDMA) scheme. Accordingly, the devices for the data communications exclusively occupy the channel during a time (Channel Time Allocation Period (CTAP)) allocated from a device called a Piconet Coordinator (PNC) and communicate data.

The 60 GHz communication, which is the next-generation WPAN, cannot apply the conventional beamforming techniques as discussed above as the Gbps-level based wireless data communication system. In addition, an RF beamformer used for military use needs to be replaced with a commercial technique in terms of the size, the power consumption, and the cost.

SUMMARY OF THE INVENTION

An aspect of the present invention is to address at least the above mentioned problems and/or disadvantages and to provide at least the advantages described below. Accordingly, an aspect of the present invention is to provide a beamforming RF vector modulator for simply implementing the beamforming with low power in Gbps-level next-generation WPAN.

According to one aspect of the present invention, a beamforming RF vector modulator includes a first amplification part for amplifying an input single RF signal and outputting differential RF signals of different phases; an RF signal converter for receiving the differential RF signals and outputting four differential signals I+, I−, Q+, and Q− of different phases, the RF signal converter comprising a polyphase filter which is virtually opened by resonance of an output terminal comprising a transmission line load; a Variable Gain Amplifier (VGA) part comprising a I VGA which varies an amplitude and a polarity of the differential signals I+ and I−, and a Q VGA which varies the amplitude and the polarity of the differential signals Q+ and Q− according to a control signal; and an RF signal synthesizer for synthesizing an output current of the I VGA and an output current of the Q VGA.

The RF signal converter may include a polyphase filter for receiving the differential RF signals and outputting signals I+, I−, Q+, and Q−. An output terminal of the polyphase filter may be connected with a transmission line load constituting a resonant circuit by connecting inductors using transmission lines and a parasitic capacitance of the circuit in parallel.

The beamforming RF vector modulator may further include a VGA controller comprising a VGA control Digital Analog Converter (DAC) which controls amplification degree of the amplitude and the phase of the differential signals I+, I−, Q+, and Q− which are the output signals of the RF signal converter.

The RF signal converter may include a two-stage polyphase filter; and a transmission line load connected to the output terminals of the two-stage polyphase filter and constituting an inductor resonant circuit by connecting inductors using a parasitic capacitance and a transmission line in parallel.

The I VGA may include a current source; a phase selector for selecting the phase to amplify with respect to the input signals I+ and I− by controlling a first phase selection signal which selects a first phase and a second phase selection signal which selects a second phase different from the first phase by 180°; and an I signal amplifier comprising a first amplifier which amplifies the input signal according to the first phase selection signal by receiving current of the current source, and a second amplifier which amplifies the input signals I+ and I− according to the second phase selection signal by receiving the current from the current source. A voltage of the current source may be changed by a signal which varies a gain of the I VGA.

The Q VGA may include a current source; a phase selector for selecting the phase to amplify with respect to the input signals Q+ and Q− by controlling a first phase selection signal which selects a first phase and a second phase selection signal which selects a second phase different from the first phase by 180°; and a Q signal amplifier comprising a first amplifier which amplifies the input signal according to the first phase selection signal by receiving current of the current source, and a second amplifier which amplifies the input signals Q+ and Q− according to the second phase selection signal by receiving the current from the current source. The voltage of the current source may be changed by a signal which varies a gain of the Q VGA.

The RF signal synthesizer may synthesize the output current of the I VGA and the output current of the Q VGA by means of the transmission line load comprising the inductors coupled in parallel using the parasitic capacitance and the transmission line.

The transmission line may use an on-chip transmission line.

The beamforming RF vector modulator may further include a second amplification part which converts the differential outputs of the RF signal synthesizer to a single output.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
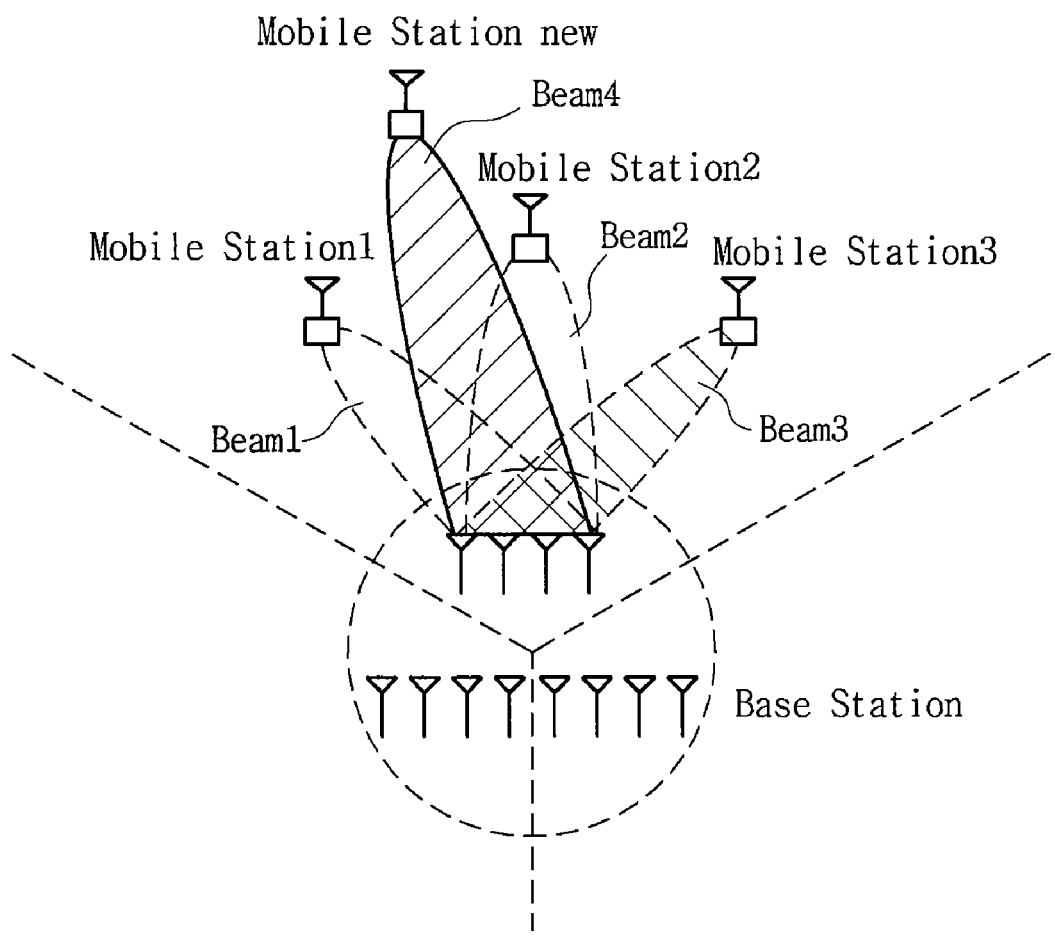
FIG. 1 is a diagram of a conventional beamforming technique.
Figure 2:
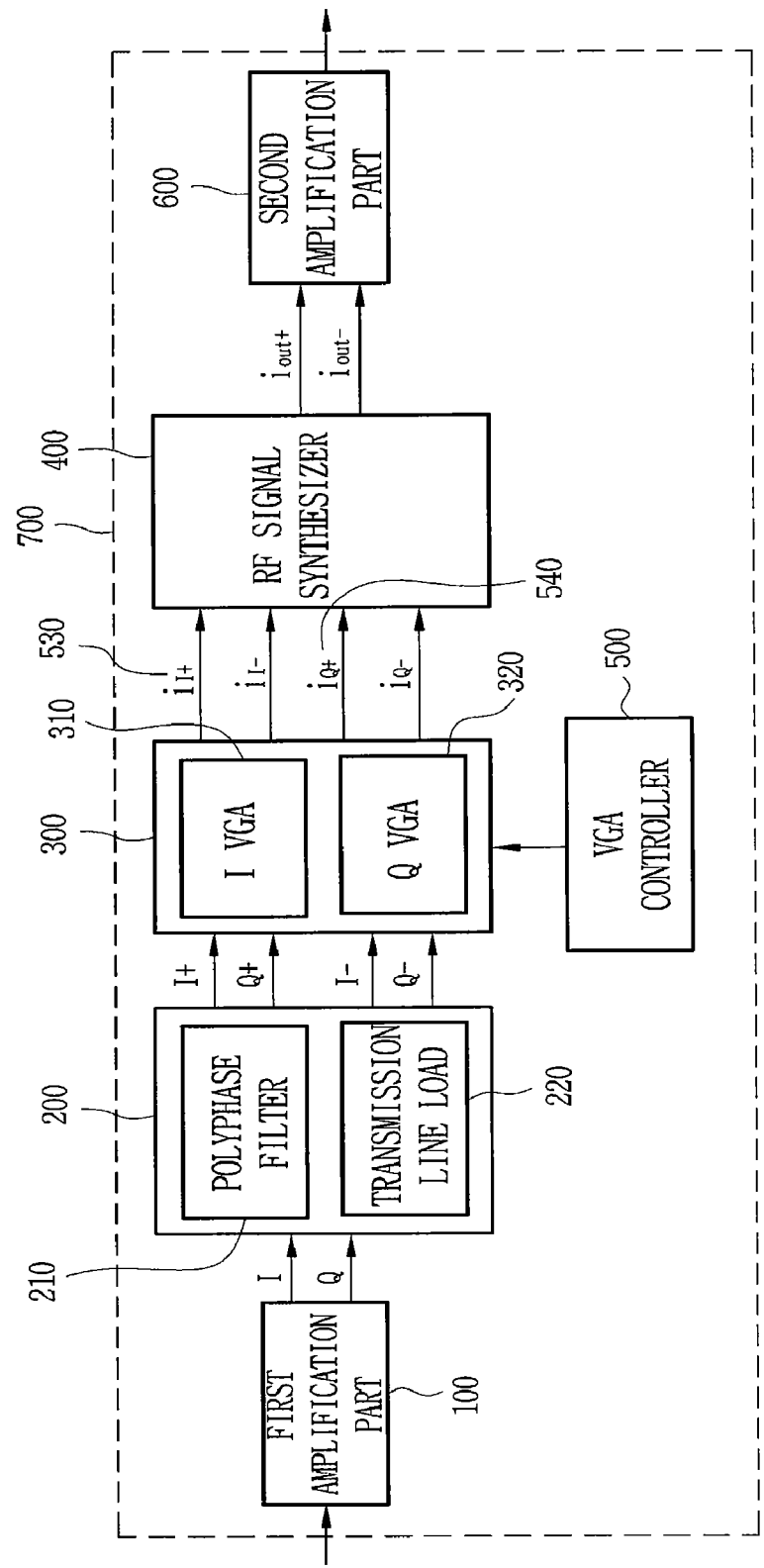
FIG. 2 is a simplified block diagram of a beamforming RF vector modulator according to an exemplary embodiment of the present invention.

FIG. 2 is a simplified block diagram of a beamforming vector modulator according to an exemplary embodiment of the present invention. Referring to FIG. 2, the beamforming vector modulator 700 according to an exemplary embodiment of the present invention includes a first amplification part 100, an RF signal converter 200 including a polyphase filter 210 and a transmission line load 220, a Variable Gain Amplifier (VGA) part 300 including an I VGA 310 and a Q VGA 320, and an RF signal synthesizer 400.

The first amplification part 100 amplifies the input RF single signal to a differential signals. For example, when a single RF signal of the phase 0° is input, the first amplification part 100 splits to the I signal of the phase 0° and the Q signal of the phase 180° and converts to the differential RF signals.

The RF signal converter 200 receives the I signal and the Q signal, which are the differential output signals of the first amplification part 100, and converts them to four signals of different phases. That is, the RF signal converter 200 converts the I signal to I+ and I− signals and the Q signal to Q+ and Q− signals. Hence, the RF signal converter 200 is called a quadrature phase generator. The RF signal converter 200 can include a two-stage polyphase filter 210 and the transmission line load 220 connected to the output of the filter. The RF signal converter 200 outputs signals of the four different phases I+, I−, Q+, and Q− from the input I signal and Q signal.

The VGA part 300 includes the I VGA 310 which receives the I+ and I− signals from the RF signal converter 200 and alters the magnitude and the polarity of the signals, and the Q VGA 320 which receives the Q+ and Q− signals and alters the magnitude and the polarity of the signals.

The RF signal synthesizer 400 synthesizes the signals of which the magnitude and the polarity are altered at the VGA part 300. The vector modulator according to the present invention selects the four I/Q phases through the RF signal converter 200 and inputs them to the VGAs 310 and 320 respectively. The VGA part 300 regulates the magnitude information of the I signal and the Q signal and thus freely controls the phase of 360° and the magnitude by combining the I and Q signals at the RF signal synthesizer 400.

$$S_0 = m_1 \cos(\omega t) + j m_2 \sin(\omega t) \quad (1)$$

In Equation (1), $S_0$ is the result after synthesizing the I signal and the Q signal at the RF signal synthesizer 400, $m_1$ is the magnitude of the I signal, and $m_2$ is the magnitude of the Q signal. $m_1$ and $m_2$ are in relation of $$outpase = \arctan\left(\frac{m_2}{m_1}\right), \; \sqrt{m_1^2 + m_2^2} = 1.$$

The signals passing through the VGAs 310 and 320 can alter the phase at the RF signal synthesizer 400 based on Equation (1) and also alter the magnitude of the signal by changing the $m_1$ and $m_2$ values.

Meanwhile, the beamforming vector modulator according to an exemplary embodiment of the present invention can further include a second amplification part 600 for converting the differential signals output from the RF signal synthesizer 400 to the single signal, which is used together with an antenna using the single output. Also, the beamforming vector modulator can further include a VGA controller 500 including a Digital Analog Converter (DAC) for controlling the amplification degree of the magnitude and the phase of the signal amplified at the VGAs 310 and 320.

Figure 3:
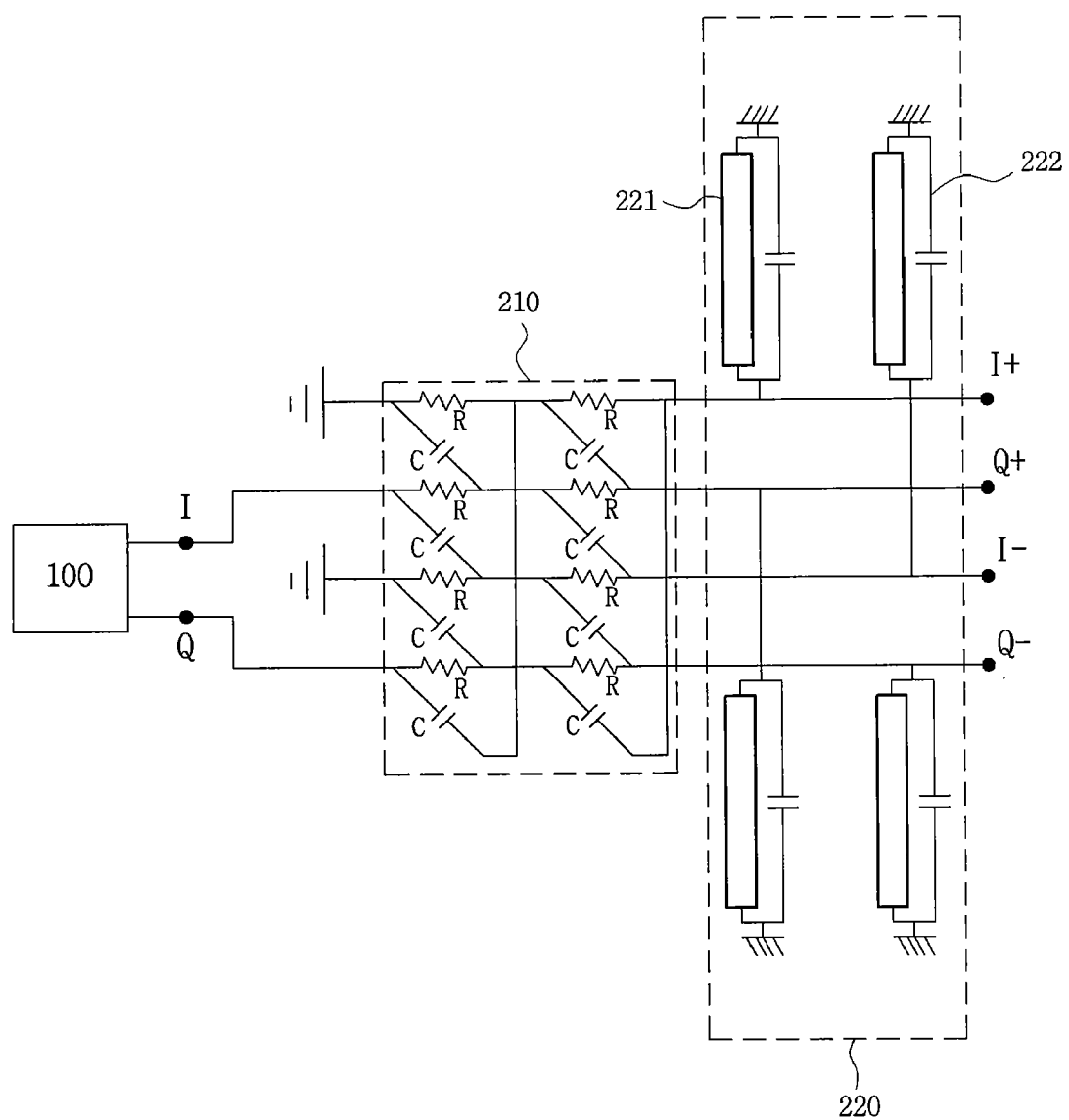
FIG. 3 is a circuit diagram of the RF signal converter of the vector modulator of FIG. 2.

FIG. 3 is a circuit diagram of the RF signal converter of the vector modulator of FIG. 2. In FIG. 3, the RF signal converter 200 includes the polyphase filter 210 and the transmission line load 220.

The polyphase filter 210 is in a bridge structure including four input terminals and four output terminals. Two input terminals are earthed and the other two input terminals receive the differential input signals I and Q. For example, the I signal can be input to the RF in+ terminal and the Q signal can be input to the RF in− terminal in FIG. 2. To produce the four I/Q phases output in the broadband to suit to the next-generation WPAN, the polyphase filters can be connected in parallel and used in two stages. The I+, I−, Q+ and Q− signals output from the output terminals of the two-stage polyphase filter 210 can be transmitted without loss when the output terminal is open. To minimize the transmission loss, the output terminal of the polyphase filter 210 can be connected with the transmission line load 220 which makes the resonant circuit in which inductors constructed with a parasitic capacitance 221 of the circuit and the transmission line are linked in parallel. By constituting the transmission line load as the LC resonant circuit, when the resonant circuit resonates in a certain operating frequency, the output terminal node of the polyphase filter is virtually opened. As such, the transmission line load of the LC resonant circuit is connected to each output terminal node of the polyphase filter.

By constructing the two-stage polyphase filter 210 and its output terminal as the transmission line load, the broadband characteristics of the WPAN can be implemented and the high loss, which is the shortcoming of the polyphase filter, can be overcome using the on-chip transmission line.

Figure 4:
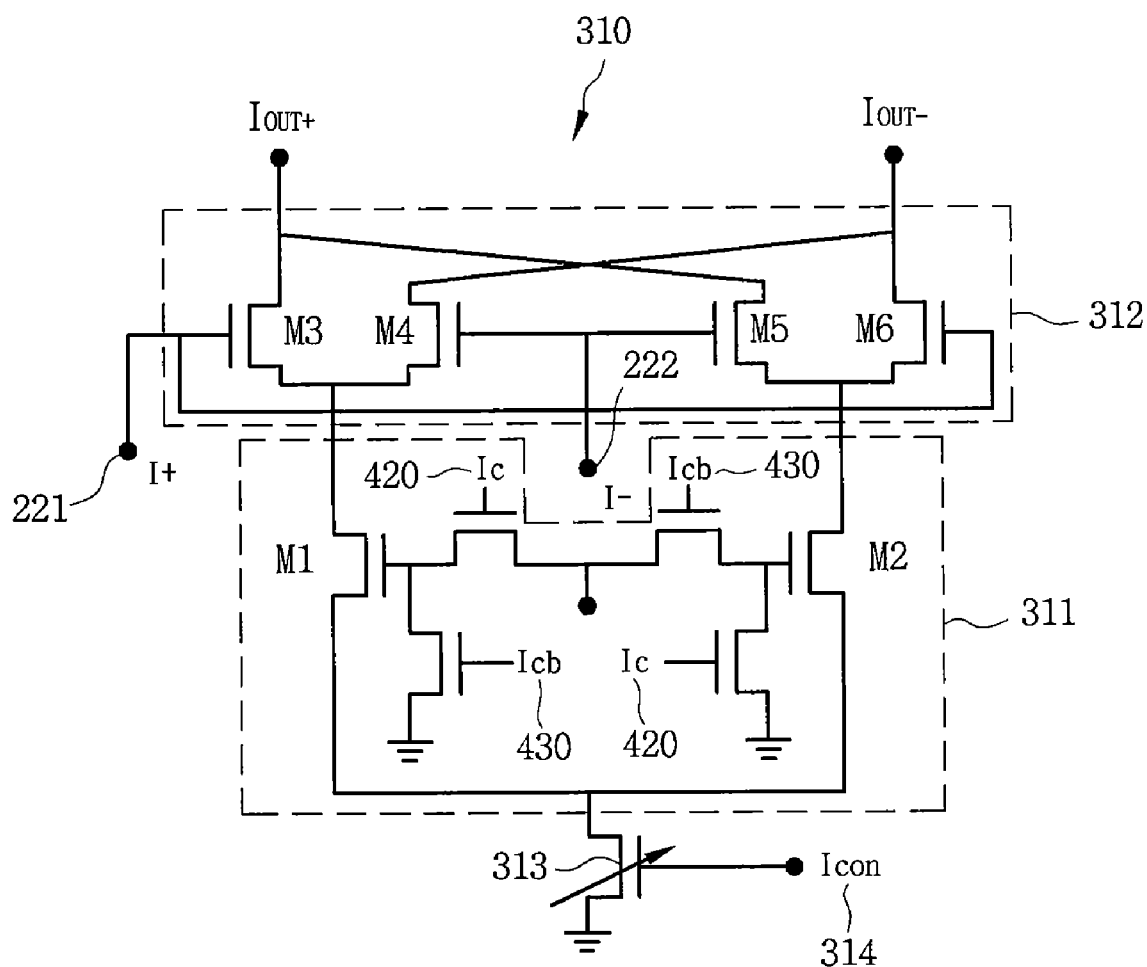
FIG. 4 is a circuit diagram of the I VGA of the VGA part of the vector modulator of FIG. 2 according to an exemplary embodiment of the present invention.

FIG. 4 is a circuit diagram of the I VGA 310 of the VGA part of the vector modulator of FIG. 2 according to an exemplary embodiment of the present invention. Referring to FIG. 4, the I VGA 310 includes a current source 313 which supplies the power, a phase selector 311, and an I signal amplifier 312 which amplifies the selected phase signal.

The phase selector 311 selects the phase to amplify with respect to the input signal (e.g., I+ and I−) using phase selection signals 420 and 430. Depending on on/off state of the first phase selection signal (e.g., Ic 420) for selecting the first phase and the second phase selection signal (e.g., Icb 430) for selecting the second phase different from the first phase by 180°, the phase selector 311 amplifies only the selected phase in the input signal. For example, referring back to FIG. 3, the phase selection signal Icon 314 alters the gain of the I VGA 310 by changing the voltage of the current source 313. The signal Ic 420 and the signal Icb 430 are the phase selector signals. When the signal Ic 420 is on and the signal Icb 430 is off, the current of the current source 313 flows to the first amplifier M3 and M4 312_a through M1. The outputs of M3 and M4 312_a are linked to the $I_{OUT+}$ terminal and the $I_{OUT-}$ terminal as shown in FIG. 3.

When the signal Ic 420 is off and the signal Icb 430 is on, the current of the current source 313 are input to M5 and M6 312_b through M2. The output of the opposite polarity from the case where the signal Ic 420 is on is amplified. Ultimately, the phase and the magnitude of the input differential signals I+ and I− can be adequately amplified by regulating the signal Icon 410, the signal Ic 420, and the signal Icb 430. The magnitude and the phase of the signals output to the terminals $I_{OUT+}$ and $I_{OUT-}$ are amplified by the I VGA 310. FIG. 4 shows the circuit of the I VGA 310, and the Q VGA 320 can be constituted the same as in FIG. 4.

Figure 5:
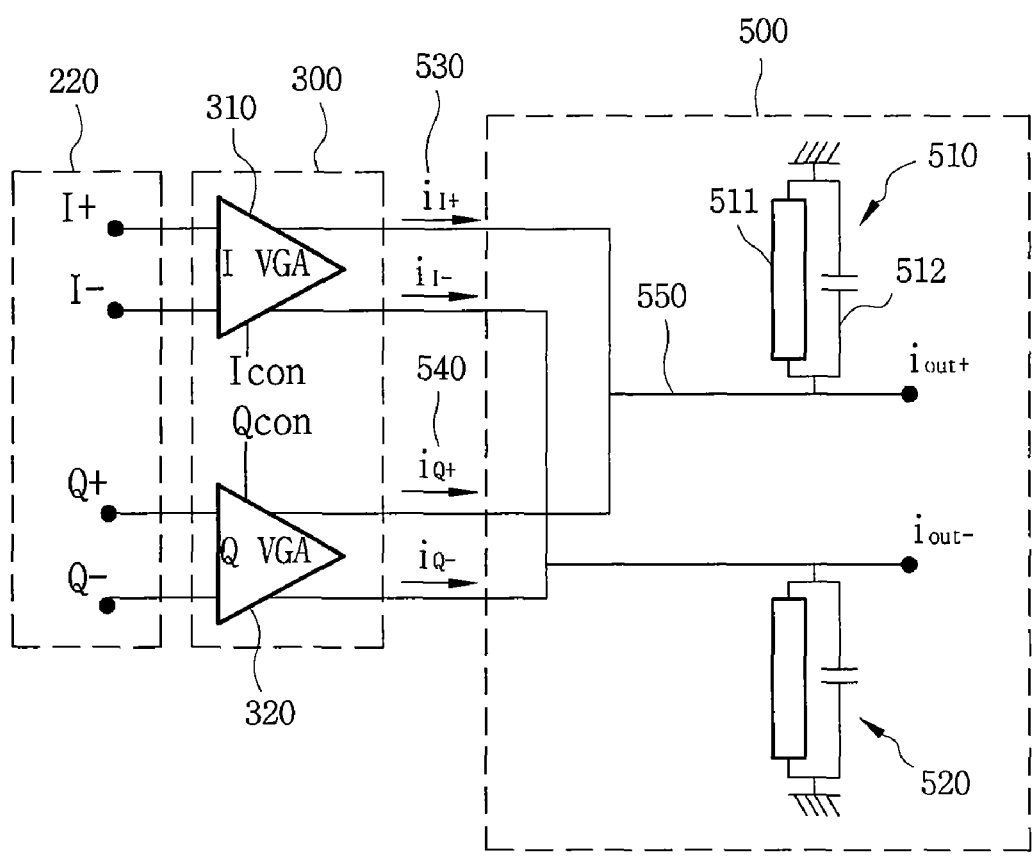
FIG. 5 is a circuit diagram of the RF signal synthesizer of the vector modulator of FIG. 2 according to an exemplary embodiment of the present invention.

FIG. 5 is a circuit diagram of the RF signal synthesizer of the vector modulator of FIG. 2 according to an exemplary embodiment of the present invention. The output signals I+ 221, I− 222, Q+ 223, and Q− 224 of the RF signal converter 200 are input to and amplified by the I VGA 310 and the Q VGA 320 respectively. The RF signal synthesizer 400 synthesizes the output signals $i_{I+}$ 530 and $i_{Q+}$ 540. The output signal $i_{I+}$ 530 is the output signal of the I VGA 310 with respect to the input signal I+, and $i_{Q+}$ 540 is the output signal of the Q VGA 320 with respect to the input signal Q+. The RF signal synthesis is carried out via the transmission line load 510 formed by connecting the transmission line 511 and the parasitic capacitor 512 in parallel. Likewise, $i_{I-}$ and $i_{Q-}$ are synthesized to $i_{out-}$ via the transmission line load 520 with respect to the input signal I− 221 and the input signal Q− 224. That is, the outputs of the I VGA 310 and the Q VGA 320, in the form of the current, are combined with the transmission line load and thus synthesize the RF signal.

According to the present invention, without using a plurality of transceivers, the beamforming can be simply implemented with the low power by use of a plurality of Low Noise Amplifiers (LNAs), Power Amplifiers (PAs), and vector modulators.

By realizing the beamforming on the single input/output condition, far more facilitated external interface can be constituted.

Further, using the amplifier based vector modulator, the lossless broadband beamformer can be designed inside the chip. Therefore, the beamforming system can be miniaturized and commercialized.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A beamforming RF vector modulator comprising:
   a first amplification part for amplifying an input single RF signal and outputting differential RF signals of different phases;
   an RF signal converter for receiving the differential RF signals and outputting four signals I+, I−, Q+, and Q− of different phases, the RF signal converter comprising a polyphase filter which is virtually opened by resonance of an output terminal comprising a transmission line load;
   a Variable Gain Amplifier (VGA) part comprising a I VGA which varies amplitude and phase of the signals I+ and I−, and a Q VGA which varies the amplitude and the polarity of the signals Q+ and Q−according to a control signal; and
   an RF signal synthesizer for synthesizing an output current of the I VGA and an output current of the Q VGA.

2. The beamforming RF vector modulator of claim 1, further comprising:
   a VGA controller comprising a VGA control Digital Analog Converter (DAC) which controls amplification degree of the amplitude and the phase of the signals I+, I−, Q+, and Q− which are the output signals of the RF signal converter.

3. The beamforming RF vector modulator of claim 1, wherein the RF signal converter comprises:
   a two-stage polyphase filter comprising polyphase filters of a bridge structure having four input terminals and four output terminal connected in parallel; and a transmission line load connected to the output terminals of the two-stage polyphase filter and comprising an inductor resonant circuit.

4. The beamforming RF vector modulator of claim 1, wherein the I VGA comprises:

a current source;

a phase selector for selecting the phase to amplify with respect to the input signals I+ and I− by controlling a first phase selection signal which selects a first phase and a second phase selection signal which selects a second phase different from the first phase by 180°; and an I signal amplifier comprising a first amplifier which amplifies the input signal according to the first phase selection signal by receiving current of the current source, and a second amplifier which amplifies the input signals I+ and I− according to the second phase selection signal by receiving the current from the current source, and a voltage of the current source is changed by a signal which varies a gain of the I VGA.

5. The beamforming RF vector modulator of claim 1, wherein the Q VGA comprises:

a current source;

a phase selector for selecting the phase to amplify with respect to the input signals Q+ and Q− by controlling a first phase selection signal which selects a first phase and a second phase selection signal which selects a second phase different from the first phase by 180°; and a Q signal amplifier comprising a first amplifier which amplifies the input signal according to the first phase selection signal by receiving current of the current source, and a second amplifier which amplifies the input signals Q+ and Q− according to the second phase selection signal by receiving the current from the current source, and a voltage of the current source is changed by a signal which varies a gain of the Q VGA.

6. The beamforming RF vector modulator of claim 1, wherein the RF signal synthesizer synthesizes the output current of the I VGA and the output current of the Q VGA by means of the transmission line load comprising the inductors coupled in parallel using the parasitic capacitance and the transmission line.

7. The beamforming RF vector modulator of claim 1, wherein the transmission line uses an on-chip transmission line.

8. The beamforming RF vector modulator of claim 1, further comprising:

a second amplification part which converts the outputs of the RF signal synthesizer to a single output.

* * * * *